United States Patent
Weston

[11] 3,849,669
[45] Nov. 19, 1974

[54] MACHINE CONTROL

[76] Inventor: Billy J. Weston, 2317 W. Belmont Ave., Chicago, Ill. 60618

[22] Filed: Apr. 4, 1973

[21] Appl. No.: 347,887

[52] U.S. Cl. .............................. 307/154, 317/135 R
[51] Int. Cl. ..................... G05d 17/02, H01h 47/00
[58] Field of Search........... 317/135 R; 307/149, 154

[56] References Cited
UNITED STATES PATENTS
2,726,379  12/1955  Behn et al...................... 317/135 R Primary Examiner—L. T. Hix
Attorney, Agent, or Firm—Hill, Gross, Simpson, Van Santen, Steadman, Chiara & Simpson

[57] ABSTRACT

A machine control employs a probe at each work station, or work transfer station, of a machine tool for sensing transfer of a work piece from one station to another. Each probe has connected thereto a controlled rectifier circuit which is operative in response to work piece transfer to energize an associated relay. Each relay has a contact which is in series circuit with a master power relay which controls an emergency stop circuit so that the failure to detect a transfer effects shut down of the machine. Each relay contact has a bypass switch connected in shunt therewith to override selected stations where it is not necessary to detect work piece transfer.

7 Claims, 3 Drawing Figures

PATENTED NOV 19 1974  3,849,669
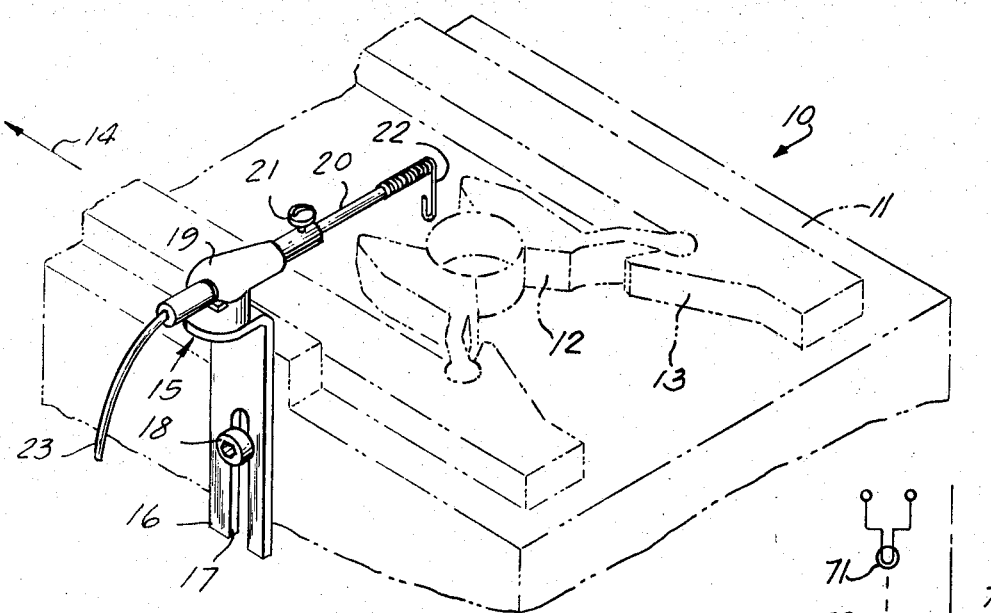
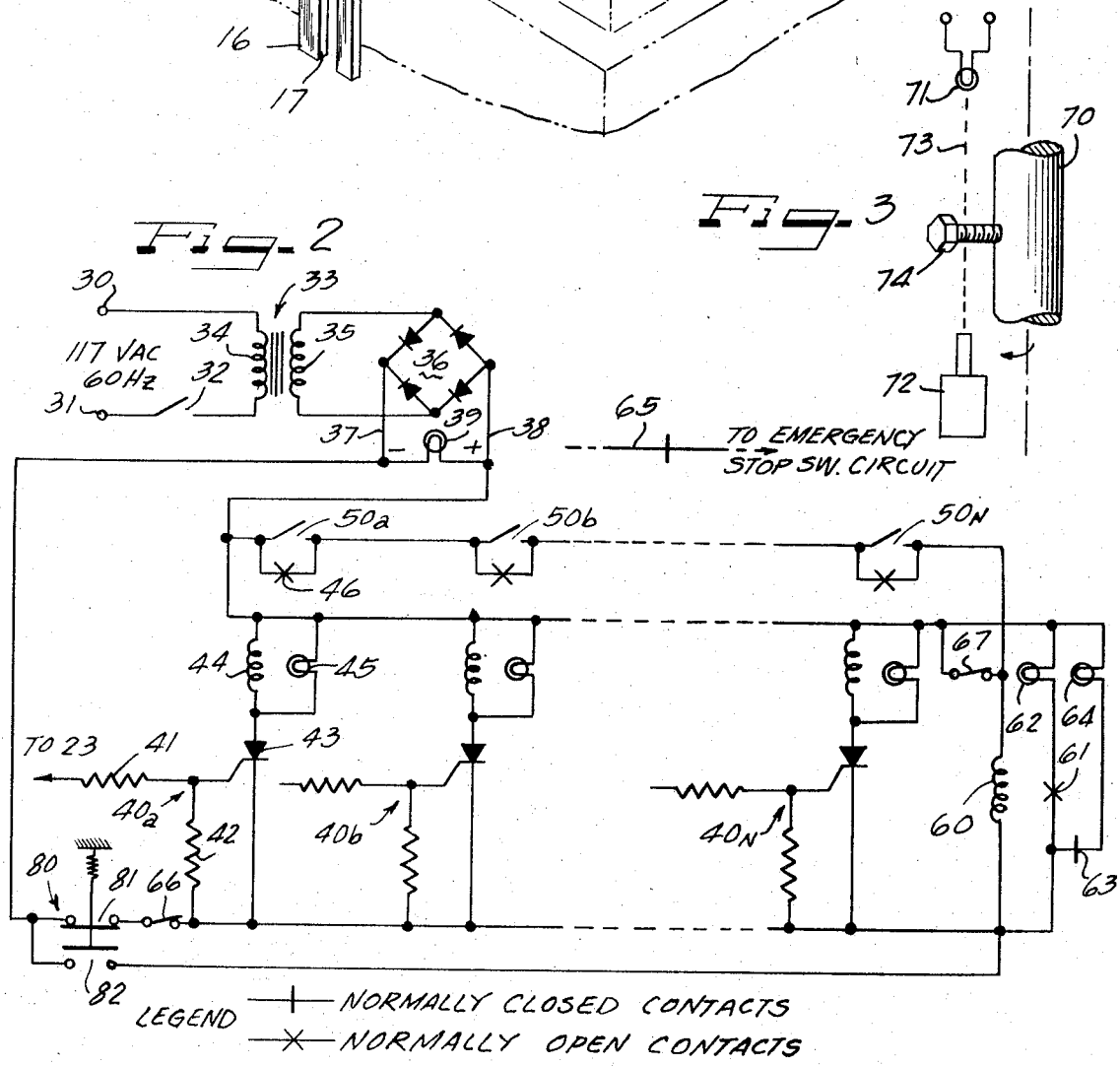
LEGEND  — NORMALLY CLOSED CONTACTS
         ✕ NORMALLY OPEN CONTACTS

MACHINE CONTROL

DESCRIPTION

This invention relates to a machine control, and more particularly to a low cost, accurate and simple machine control for monitoring and controlling machine operations in response to work piece transfer from work station to work station.

The prior art recognizes many machine controls which range from very simple individual station controls to relatively complex electronic controls for monitoring and controlling a plurality of work stations or a machine having a plurality of work stations. Generally these controls have suffered from unreliable operation at one end of this range of apparatus to extreme complexity and expense at the other end of such range.

It is therefore the object of the present invention to provide a simple, effective, accurate and inexpensive machine control for monitoring and controlling the operation of a machine which requires work piece transfer between work stations.

According to the invention, each work station is provided with a work piece detection probe which is connected to operate a controlled rectifier stage upon work piece transfer. The controlled rectifier stage includes a respective relay having a relay contact connected in series with the energizing circuit of a master relay which controls an emergency stop circuit of the machine so that a positive reaction must be obtained in response to work piece transfer at each work station to prevent the master relay from operating the emergency stop circuit. Each of the individual relays has a switch connected in shunt relation to the relay contact so that detection of work piece transfer at a particular station may be ignored by simulating work piece transfer upon closure of the associated switch.

Such machines usually have an exposed shaft which carries a cam for operating a reset switch for each cycle of operation of the machine. The present invention advantageously employs a photoelectric device for this purpose wherein the light beam may be broken by a cam carried on the shaft, or simply by a screw or stud extending from the shaft.

Other objects, features and advantages of the invention, its organization, construction and operation will be best understood from the following detailed description of a preferred embodiment thereof taken in conjunction with the accompanying drawing, on which:

FIG. 1 is a perspective view of a sensor probe at a point of work piece transfer;

FIG. 2 is an electrical schematic diagram of the machine control circuit constructed in accordance with the present invention; and FIG. 3 is a schematic illustration of a photoelectric machine cycle detector.

Referring to FIG. 1, a sensor probe is illustrated for detecting work piece transfer, as is disclosed in a manual on the Clarktron Transfermatic Control manufactured by the Clarktron Division of Clark Metal Products, Inc. of Fairfield, Conn. For other probe shapes, and the like, reference may be had to this publication. The probe is mounted at a point 10 of a machine where work piece transfer is to be detected. A work piece 12 is carried on a table 11 and moved by a work piece transfer apparatus 13 in the direction of an arrow 14. A sensor probe assembly 15 includes a mounting bracket 16 having an adjustment slot 17 which is secured to the table 11 by means of a screw 18. A probe 19 is provided with a conductive rod 20 which is secured by a screw 21 and which carries a probe contact 22 disposed in an interference relationship with the work piece 12. The probe 22 is connected to the machine control circuit by means of an electrical conductor 23. Turning to FIG. 2, a machine control circuit is schematically illustrated as comprising a pair of input terminals 30, 31 for connection to an electrical supply, for example 117 VAC, 60 Hz. A power on/off switch 32 is connected between the terminal 31 and a primary winding 34 of a transformer 33, the other terminal of the primary winding 34 being connected to the input terminal 30. The transformer 33 comprises a secondary winding 35 which is connected across a full wave bridge rectifier 36.

The circuit so far described constitutes the power supply for the machine control circuit. The bridge rectifier 36 includes a pair of output leads 37, 38 which have a power on/off lamp 39 connected thereacross to indicate proper connection to an electrical supply and proper operation of the power supply circuit.

The conductors 37 and 38 are further connected across a plurality of controlled rectifier circuits which respond to respective probe contacts 22 to indicate the work piece transfer state of the machine. The conductor 37 is extended through normally closed contacts 81 of a reset switch 80 to the cathode terminal of a controlled rectifier in each controlled rectifier state 40A–40N. Only the stage 40A has been given reference numerals for sake of clarity. The conductor 37 is therefore connected by way of the contacts 81 to the cathode of a silicon controlled rectifier 43 which has a gate electrode connected to the conductor 37 by way of a resistor 42 and to the respective probe by way of a resistor 41. The anode of the silicon controlled rectifier is connected to the conductor 38 by way of a relay winding 44 and a lamp 45 connected across the relay winding 44.

The conductor 38 is further connected to a normally opened contact 46 of the relay which, in turn, is connected in series with other such relay contacts.

Each work piece transfer detection circuit also comprises a respective manually operable switch 50A–50N which may be employed to simulate work piece transfer in the circuit at times when it is not necessary to detect work piece transfer at that particular station. The reason for this shunt connection will become apparent from the description of circuit operation.

The conductor 37 and the conductor 38 are further extended to the terminals of a relay winding 60 by way of a pair of respective switches 66 and 67. The switches 66 and 67 are controlled in response to cycling of the machine and may be cam operated contacts. However, according to the present invention, a photoelectric detection circuit is preferred over the cam operated type of apparatus in that there are no movable parts, such as actuating arms or the like and a simple circuit may be employed to improve overall performance and longevity of the equipment.

The relay winding 60 controls the opening and closing of a plurality of relay contacts 61, 63 and 65. The relay contacts 61 and 63 are employed to control the operation of run and reset lamps 62 and 64 which are connected across the conductors 37 and 38 by way of these relay contacts. The relay contacts 65 are employed to operate the emergency stop switch circuit of the machine, which in most cases is an air brake or similar pneumatic device. In operation, assuming the switch 32 to be closed and a suitable potential to exist across the conductors 37 and 38, the reset switch 80 is depressed to first open the contacts at 81 and ensure that all of the silicon controlled rectifiers 43 and associated relays 44 are in a non-conducting condition. The contacts 82 then momentarily close while the switch is depressed to extend operating power to the relay winding 60 by way of the closed contacts 67 which hold the relay operated until the machine cycles. The machine is placed in operation and the work pieces are transferred from station to station.

During transfer, a low potential is applied to the resistor 41 by way of the table 11, the work piece 12, the contact 22 and the conductor 23. This low voltage signal develops a gating signal across the resistor 42 to turn on the silicon controlled rectifier 43 associated with the respective transfer detection point. The silicon controlled rectifier 43 conducts and an energizing current flows through the winding of the relay 44 causing the contact 46 to close.

Inasmuch as all work pieces are transferred at the same time, simultaneous detection of transfer by the respective probe contacts 22 will provide continuity from the conductor 38 to the upper terminal of the relay winding 60 so that the winding 60 is maintained in an energized condition. With the winding 60 energized, the contacts 61 are closed to cause energization of the run lamp 62 and the contacts 63 are open to cause deenergization of the reset lamp 64.

The contacts 65 to the emergency stop switch circuit are open while the relay winding 60 is energized to prevent machine shut down.

If for some reason the winding 60 becomes deenergized, the contacts 61 open and the contacts 63 close reversing the indications of the lamps 62 and 64, and the contacts 65 close to initiate shut down of the machine.

In some instances, it is not necessary to detect work piece transfer and a probe for this function is not provided. Therefore, bypass switches, such as the switch 50A, are provided to simulate detection of article transfer by shunting the associated relay contact and providing continuity of the conductor 38.

The contacts 66 and 67 may be cam operated contacts, or as explained below with reference to FIG. 3 may function as cam operated contacts, where the machine has a shaft which rotates at a 1:1 ratio with respect to work piece transfer. The contacts 66 and 67 are operated once each revolution of the shaft. The contacts 66 are in series with the negative line 37 and trip before the contacts 67 to momentarily open the circuit for reset of the controlled recitifer circuits when the machine is in its fully opened condition between work operations. The contacts 67 provide a holding circuit for the relay winding 60.

Referring to FIG. 3, a shaft of the machine which rotates at a 1:1 ratio with respect to work piece transfer is schematically illustrated at 70 adjacent a light source 71 which directs a light beam 73 along the shaft to a photoelectric detector 72. The photoelectric detector 72 may include photoelectric switches of a type which are well known in the art and which may constitute the contacts 66 and 67 in FIG. 2. The shaft 70 may be provided with a cam having a lobe for interrupting the light beam 73, or may simply be provided with a stud or screw 74 for interrupting the light beam.

In a circuit constructed in accordance with the principles of the present invention as set forth in FIG. 2, the relays 44, 46 were provided by relays having the Model No. GB 831-A-4, the relay 60, 61, 63, 65 was provided by a 12 volt double pole double throw relay, the silicon controlled rectifier 43 was a G.E. MR-5 component, the resistors 41 were ¼ watt, 620 ohm and the resistor 42 was a ¼ watt, 1,000 ohm element. The light detector apparatus 72 may be a G.E. L8A light activated SCR.

It should be apparent that a control unit may, for reason of manufacturing standardization and economy, contain more sensing circuits than there are transfer points on a machine. The bypass switches may advantageously be employed to effectively "decrease" the capacity of a control unit employed in such a situation.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A machine control comprising:
   a plurality of work piece sensing probes for use at a plurality of transfer points between work stations of a machine;
   a control circuit normally conditioned to permit normal machine operation and operable to stop the machine;
   a plurality of sensing circuits connected to respective ones of said probes and jointly operable in response to detection of transfer of a work piece at each point to maintain said control circuit in its normal condition;
   a plurality of simulator circuits connected to respective ones of said sensing circuits for simulating the operation of a probe and its associated sensing circuit when such probe and circuit are not being used; said control circuit including a relay having a winding connected to said sensing circuits; and
   a cyclically operated switch means having first contacts connected to said sensing circuits for cyclically resetting said sensing circuits and second contacts connected to said control circuit relay winding for holding the relay operated between resetting of the sensing circuits and operation of the sensing circuits in response to detection of work piece transfer.

2. A machine control as claimed in claim 1, wherein said cyclically operated switch means includes a light source, a photoelectric switch means for receiving the light beam from said source, said source and photoelectric switch means mounted adjacent a rotating shaft of the machine, and a member carried by the shaft for cyclically interrupting the light beam.

3. A machine control comprising:
   a plurality of work piece sensing probes for use at a plurality of transfer points between work stations of a machine;

a control circuit normally conditioned to permit normal machine operation and operable to stop the machine;

a plurality of sensing circuits connected to respective ones of said probes and jointly operable in response to detection of transfer of a work piece at each point to maintain said control circuit in its normal condition;

a plurality of simulator circuits connected to respective ones of said sensing circuits for simulating the operation of a probe and its associated sensing circuit when such probe and circuit are not being used;

said control circuit including a relay having a winding connected to said sensing circuits; and said sensing circuits each including a relay having a winding and contacts connected in series with the other such relay contacts and with said control circuit relay winding, and a controlled conduction device connected in series with said sensing circuit relay winding and having a control electrode connected to the respective probe.

4. A machine control as claimed in claim 3, wherein said controlled conduction device includes a silicon controlled rectifier.

5. A machine control as claimed in claim 3, wherein said simulator circuits each includes a manually operable switch having switch contacts connected in parallel with the contacts of the associated sensing circuit relay contacts.

6. A machine control as claimed in claim 3, comprising a run lamp and a stop lamp, and said control circuit relay including contacts connected to said lamps for alternate energization thereof to visually indicate the operational status of the machine.

7. A machine control as claimed in claim 3, comprising a plurality of indicator lamps connected to respective ones of said sensing circuits to indicate the operational state thereof.

* * * * *